(12) United States Patent
Shaath et al.

(10) Patent No.: US 7,509,318 B2
(45) Date of Patent: Mar. 24, 2009

(54) AUTOMATIC RESOURCE TRANSLATION

(75) Inventors: Hilal Ramadan Shaath, Redmond, WA (US); Reena Agarwal, Sammamish, WA (US); Andrew Thomas Marshall, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 11/045,248

(22) Filed: Jan. 28, 2005

(65) Prior Publication Data

US 2006/0173840 A1 Aug. 3, 2006

(51) Int. Cl.
G06F 17/30 (2006.01)

(52) U.S. Cl. .................. 707/6; 704/2; 715/704
(58) Field of Classification Search ................. 717/141; 704/2; 707/6
See application file for complete search history.

(56) References Cited

U.S. PATENT DOCUMENTS

| | | | |
|---|---|---|---|
| 5,243,519 A | | 9/1993 | Andrews et al. |
| 5,303,151 A | * | 4/1994 | Neumann ................. 704/2 |
| 5,357,430 A | | 10/1994 | Rackow et al. |
| 5,644,775 A | * | 7/1997 | Thompson et al. ......... 704/7 |
| 5,678,039 A | * | 10/1997 | Hinks et al. .............. 707/4 |
| 5,805,832 A | | 9/1998 | Brown et al. |
| 6,055,528 A | * | 4/2000 | Evans ..................... 707/3 |
| 6,119,078 A | | 9/2000 | Kobayakawa et al. |
| 6,334,101 B1 | | 12/2001 | Hetherington et al. |
| 6,415,249 B1 | | 7/2002 | Blakely et al. |
| 6,453,280 B1 | | 9/2002 | Yang |
| 6,460,015 B1 | | 10/2002 | Hetherington et al. |
| 6,502,064 B1 | | 12/2002 | Miyahira et al. |
| 6,519,557 B1 | | 2/2003 | Emens et al. |
| 6,530,039 B1 | | 3/2003 | Yang |
| 2004/0102956 A1 | * | 5/2004 | Levin ..................... 704/2 |
| 2005/0055217 A1 | * | 3/2005 | Sumita et al. ............ 704/277 |
| 2006/0130026 A1 | * | 6/2006 | McHugh et al. .......... 717/141 |

* cited by examiner

*Primary Examiner*—John R. Cottingham
*Assistant Examiner*—Noosha Arjomandi
(74) *Attorney, Agent, or Firm*—Marshall, Gerstein & Borun LLP

(57) ABSTRACT

A novel technique for translating a string displayable on a user interface element in a graphical user interface provides a reliable translation without the use of a dictionary. In an embodiment of the invention, an identification is obtained, wherein the identification identifies the user interface element on which the string is displayed. A list is accessed, comprising the identification and a string in the second language. The list is searched to find the identification for the user interface element. Finally, a string is ascertained in the second language corresponding with the found identification in the list. In another embodiment, a string displayable on a user interface element is translated when the location of a user interface selection device on a display is at a location shared by the user interface element.

14 Claims, 9 Drawing Sheets

| | String | Resource ID | Resource Type | Parent ID | Unique ID |
|---|---|---|---|---|---|
| 520 | "Yes" | "1234" | "DialogueItem" | "Filename.exe" | "1234DialogueItemFilename.exe" |
| 522 | "No" | "5678" | "DialogueItem" | "Filename.exe" | "5678DialogueItemFilename.exe" |
| 524 | "Yes" | "9012" | "DialogueItem" | "Word-Processor.exe" | "9012DialogueItemWord-Processor.exe" |
| 526 | "Yes" | "1234" | "DialogueItem" | "Database.exe" | "1234DialogueItemDatabase.exe" |
| 528 | "File" | "3456" | "MenuItem" | "Filename.exe" | "3456MenuItemFilename.exe" |

FIG. 5A

| String | Resource ID | Resource Type | Parent ID | Unique ID |
|---|---|---|---|---|
| "Yes" | "1234" | "DialogueItem" | "Filename.exe" | "1234DialogueItemFilename.exe" |
| "No" | "5678" | "DialogueItem" | "Filename.exe" | "5678DialogueItemFilename.exe" |
| "Yes" | "9012" | "DialogueItem" | "Word-Processor.exe" | "9012DialogueItemWord-Processor.exe" |
| "Yes" | "1234" | "DialogueItem" | "Database.exe" | "1234DialogueItemDatabase.exe" |
| "File" | "3456" | "MenuItem" | "Filename.exe" | "3456MenuItemFilename.exe" |
| ... | ... | ... | ... | ... |

FIG. 5B

| String | Resource ID | Resource Type | Parent ID | Unique ID |
|---|---|---|---|---|
| "Yes" | "1234" | "DialogueItem" | "9012" | "1234DialogueItem9012" |
| "No" | "5678" | "DialogueItem" | "9012" | "5678DialogueItem9012" |
| "Would you like to continue?" | "9012" | "DialogueBox" | | "9012DialogueBox" |
| . | . | . | . | . |
| . | . | . | . | . |
| . | . | . | . | . |

AUTOMATIC RESOURCE TRANSLATION

FIELD OF THE INVENTION

This invention pertains generally to software globalization and more particularly to automatic resource translation in a graphical user interface from one language to another.

BACKGROUND OF THE INVENTION

With the increasing globalization of computer access, the need for graphical user interfaces (GUI) in different languages also continues to expand. However, with multiple versions of GUI'S, each in a different language, each version must be tested to verify that the user interface elements perform properly in the given language. This presents a problem for testers in that they usually do not speak multiple languages. In any case, even testers that speak more than one language will likely not be able to speak all of the languages needed to test every GUI version. Thus, testers are typically forced to look up resource identifications (ID) for various elements of the graphical user interface being tested. The tester must then run his or her tests using the resource ID, which is typically a number, rather than the natural name of the user interface element. This process is both time-consuming and unintuitive for a tester.

Furthermore, technical support representatives are similarly unlikely to speak more than a few languages at most. Therefore, when technical support personnel attempt to assist users running GUI'S in languages that the particular technical support personnel are unable to read, they must typically involve other personnel capable of reading the language of interest in order to render the required assistance. This is inefficient and time consuming for the technical support personnel and can be irritating for customers, such as when they are put on hold while technical support locates a representative that can help.

Embodiments of the invention provide methods and systems that address these problems. Other advantages of the embodiments of the invention, as well as additional inventive features, will be apparent from the description of the invention provided herein.

BRIEF SUMMARY OF THE INVENTION

Embodiments of the invention solve the shortcomings inherent in prior techniques by providing a reliable translation of a user interface element displayed within a graphical user interface from one language into another language. A tester does not need to use a number to perform testing, and a tester or technical support representative is able to manually navigate through a graphical user interface in a language they are unable to read.

In particular, an embodiment of the invention provides a method in a computer system for translating a string displayable on a user interface element from a first language to a second language. The method comprises, obtaining an identification, wherein the identification identifies the user interface element on which the string is displayed, accessing a list, wherein the list comprises the identification and a string in the second language, searching the list to find the identification for the user interface element, and ascertaining a string in the second language corresponding with the resource identification in the list.

Another embodiment of the invention provides, in a computer system having a graphical user interface including a display and a user interface selection device, wherein a string in a first language is displayable on a user interface element, a method for translating the string from the first language to a second language. The method comprises, receiving input defining a location on the display of the user interface selection device, finding the user interface element having thereon the string in the first language, wherein the user interface element is associated with the defined location, obtaining an identification associated with the user interface element, accessing a list, wherein the list comprises the identification and a string in the second language, searching the list to find the identification for the user interface element, ascertaining a string in the second language corresponding with the found identification in the list, and displaying the string in the second language on the display.

Yet another embodiment of the invention provides a computer-readable medium having stored thereon a data structure. The data structure comprises a first data field containing data representing an identifier for a user interface element and a second data field containing data representing a string. Each entry in the first data field is associated with a single entry in the second data field, and the first data field is searchable to find an identifier for a user interface element.

Additional features and advantages of the embodiments of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 5A is a list illustrating example contents of a resource file in accordance with an embodiment of the invention;

FIG. 5B is a list illustrating example contents of a resource file in accordance with another embodiment of the invention;

DETAILED DESCRIPTION OF THE INVENTION

Figure 1:
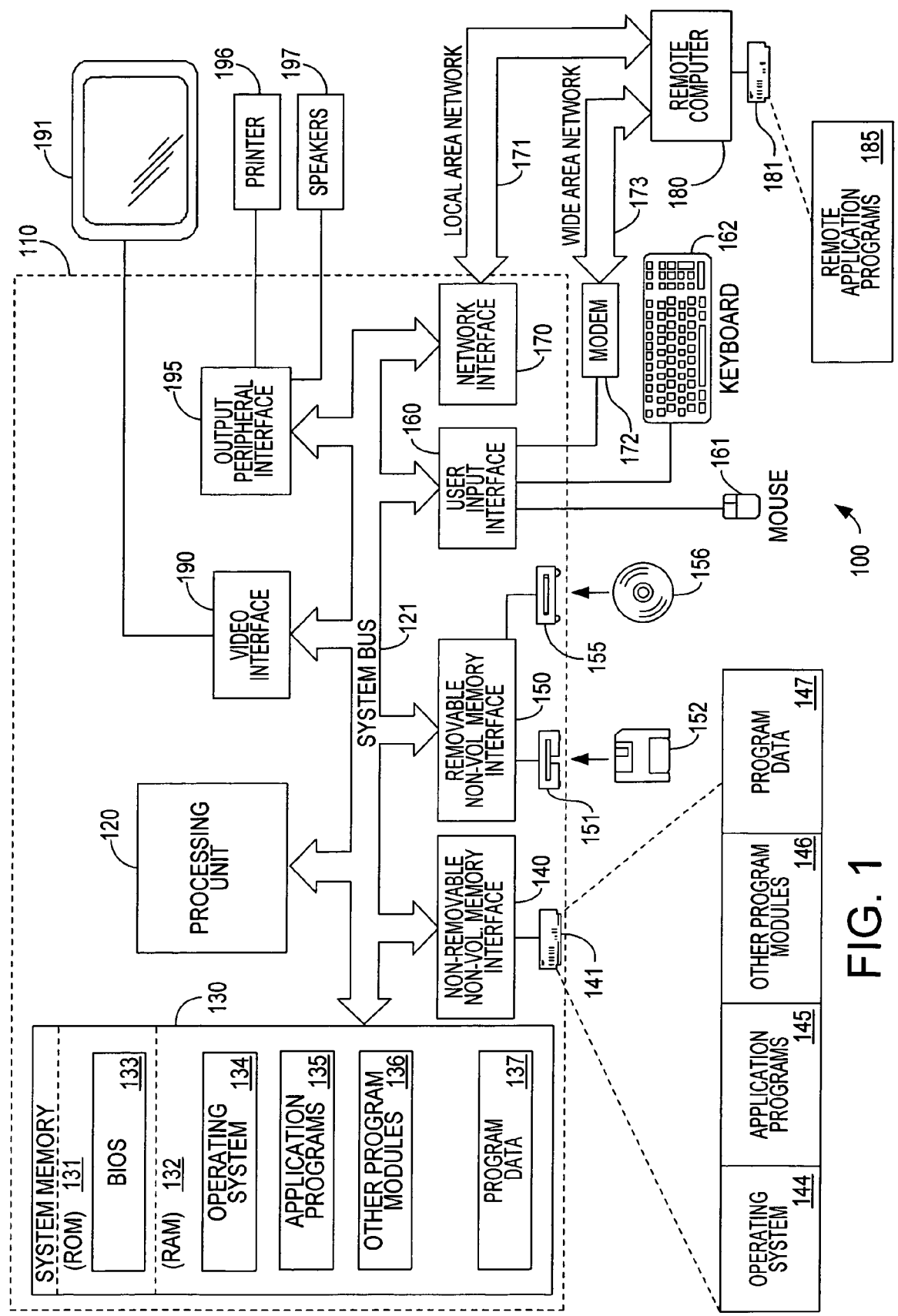
FIG. 1 is a block diagram generally illustrating an exemplary computer system on which the present invention resides.

Turning to the drawings, wherein like reference numerals refer to like elements, embodiments of the invention are illustrated as being implemented in a suitable computing environment. Although not required, embodiments of the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that embodiments of the invention may be practiced with other computer system configurations, including hand-held devices, multi-processor systems, microprocessor based or programmable consumer electronics, network PCs, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of the embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, embodiments of the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while embodiments of the invention are being described in the foregoing context, it is not meant to be limiting as those of skill in the art will appreciate that various of the acts and operation described hereinafter may also be implemented in hardware.

Figure 2:
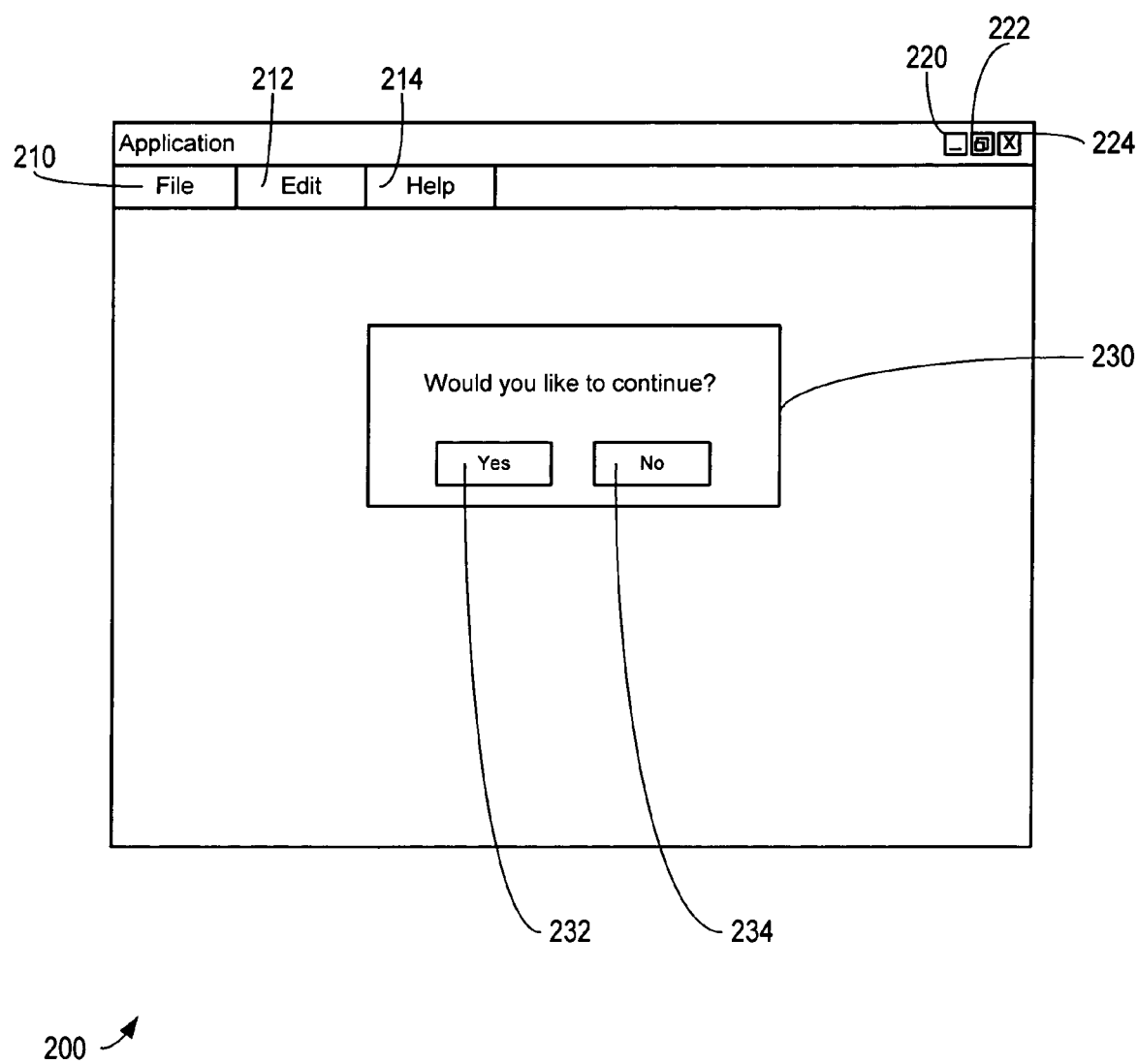
FIG. 2 is an example of a graphical user interface with user interface elements.

In accordance with an embodiment of the invention, there is shown in FIG. 2 an example of a graphical user interface (GUI) 200 displayable on a display device. The GUI 200 may have all or any of several types of user interface elements including, for example, menu items 210, 212, 214, window manipulation buttons 220, 222, 224 (to respectively minimize, maximize, or close the window), and one or more dialogue boxes 230 with dialogue box user interface elements 232 ("yes") and 234 ("no") therein. The GUI shown in FIG. 2 is illustrative only, and one of ordinary skill in the art will appreciate that embodiments of the invention are applicable as well to GUI's and user interface elements other than those shown.

Figure 3:
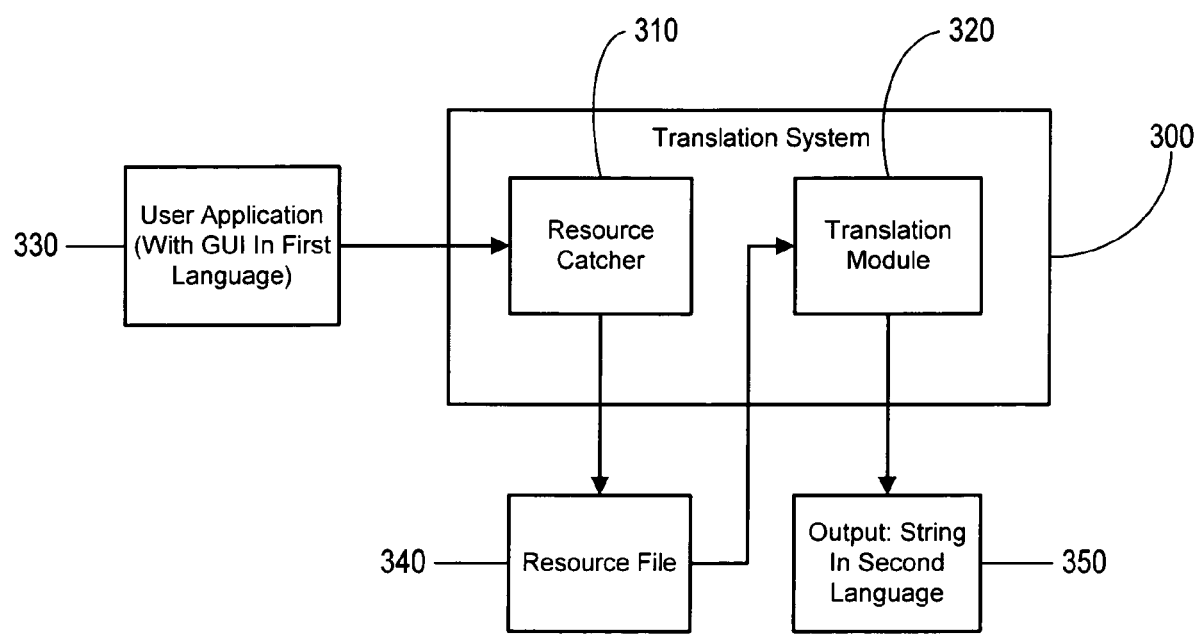
FIG. 3 is a diagram illustrating a translation system in accordance with an embodiment of the invention.

There is shown in FIG. 3, a translation system 300 in accordance with an embodiment of the invention. Certain embodiments of the invention comprise both a resource catcher 310 and a translation module 320. The resource catcher 310 gathers from an input 330, such as an application, all of the strings in a first language in the input 330 and an identification (ID) for the user interface element that displays each string. This information is then stored into a resource file 340. The translation module 320 translates a string displayable on a user interface element from one language to another. The translation module 320 uses the resource file 340 to compare an ID with the ID's in the resource file 340 to find a string in a second language. All aspects of the translation module 320 and/or the resource catcher 310 may operate within a centralized function, such as a macro for example, which may make the function transparent to the user. These and other aspects of the embodiments of the invention are explained with more detail below.

Figure 4:
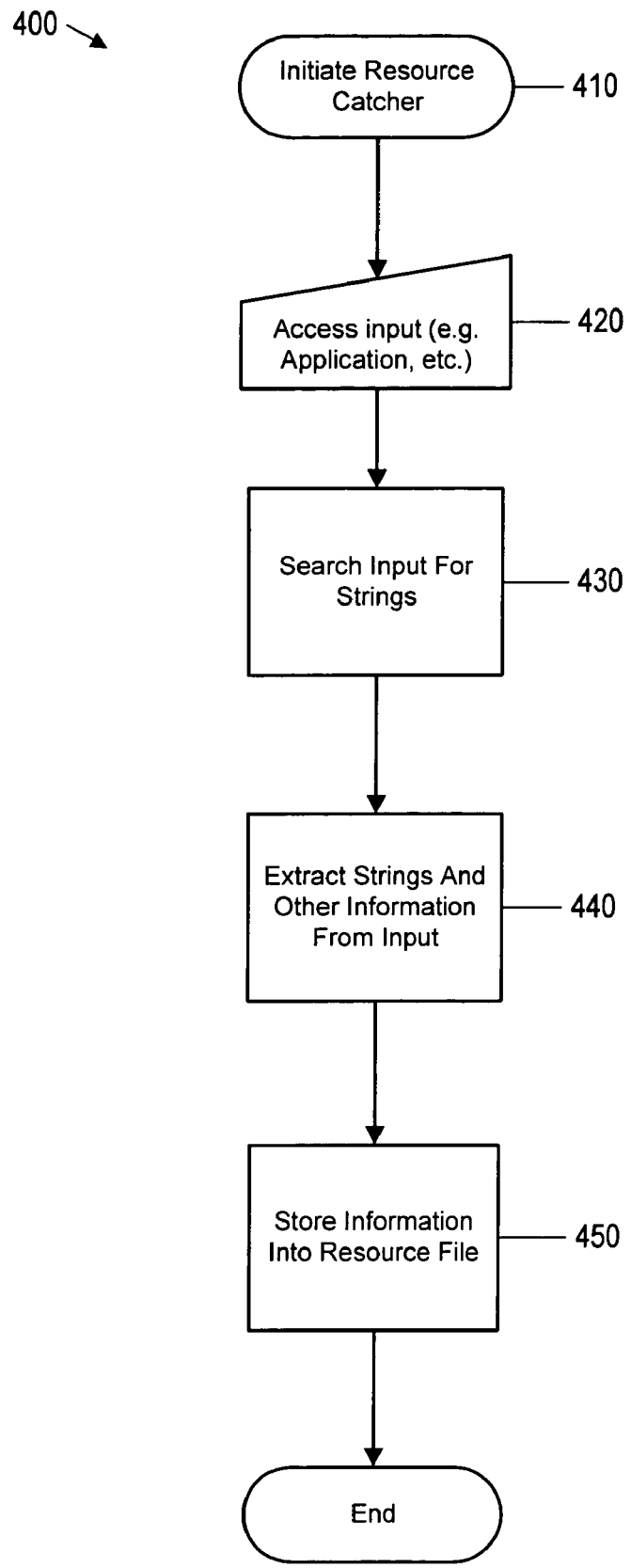
FIG. 4 is a flow diagram for a resource catcher in accordance with an embodiment of the invention.

In accordance with an embodiment of the invention, there is shown in FIG. 4, a flow chart illustrating a process 400 executed by the resource catcher 310. The resource catcher 310 is initiated at step 410. Once initiated, the resource catcher 310 accesses an input 330 such as a file, object, application, etc. in step 420. The resource catcher 310 searches through the input 330 in step 430 for strings associated with user interface elements. When a string is found, the resource catcher 310 extracts the string in step 440 and stores the string in a list in the resource file 340 in step 450. An ID for the user interface element in which the string is displayed is also extracted in step 440 and stored in the resource file 340 in step 450.

FIG. 5A illustrates a list 500 within an embodiment of the resource file 340. The list 500 may be a data structure. The list 500 may have, for example, fields 510, 512, 514, 516, and 518 for storing information such as a string, resource ID, resource type, parent ID, and a unique ID, respectively. Each user interface element from the input 330 that displays a string has an individual entry in the resource file, such as entries 520, 522, 524, 526, 528. These fields may be searchable to find specific entries within the fields. Within these fields and as mentioned above, the resource file may contain a string and an ID for the user interface element on which the string is displayable. In some embodiments, the ID is the resource ID for the user interface elements listed within the resource file 340. In other embodiments, the ID may be a unique ID that uniquely identifies user interface elements. It may be desirable in step 450 to store more fields of information than only the string and the ID (i.e., the resource ID and/or unique ID) in the resource file 340. By way of example and not limitation, a user may also decide to extract in step 440 and in step 450 store other identifiers associated with the user interface element from which the string was extracted, such as the user interface element type (e.g., menu item, dialogue box, dialogue item, etc.) or the parent identification (e.g., "Filename.exe"). Due to the fact that the ID is used to identify a user interface element, and not a specific string, there may be multiple entries in the resource file 340 having the same strings but with different ID's. For example, it can be seen in FIG. 5A that entries 520 and 524 have the same strings, "Yes," but different resource ID's, "1234" and "9012," and unique ID's, "1234DialogueItemFilename.exe" and "9012DialogueItemWord-Processor.exe," respectively.

Also shown in FIG. 5A, the resource catcher 310 may be used to store strings from a single input or alternatively it may be used to store strings from a plurality of inputs. A difficulty that potentially arises when the resource catcher 310 is used to store strings from multiple inputs in a single resource file 340 is that multiple entries in the resource file 340 could have identical resource ID's. For example, a single user interface element may be used in multiple applications. Thus, the user interface elements would have the same resource ID, but would be associated with different applications. When this occurs, the resource ID cannot be used to uniquely identify a user interface element. To distinguish such user interface elements with identical resource ID's, a unique ID may be used in certain embodiments of the invention to uniquely identify user interface elements in the context in which they appear.

In certain embodiments of the invention, a unique ID is created by concatenating the resource ID of the user interface element with other information associated with the user interface element. By way of example and not limitation, the resource ID for the user interface element may be concatenated with its resource type and the parent identification for the input from which it is extracted to create a unique ID. One of ordinary skill in the art would recognize that a unique ID could be created using other combinations of attributes of the resource file. As shown in FIG. 5A, this unique ID is stored in the resource file to differentiate between multiple user interface elements having the same resource ID. Therefore, in some embodiments, the resource file 340 may comprise the string, resource ID associated with the user interface element upon which that string is displayed, and additional information (e.g., unique ID, parent identification, and/or resource type). In other embodiments, the user may anticipate that multiple user interface elements will have the same resource ID and decide to have the resource catcher 310 store in step 450 only the string and the unique ID. Once the desired information is stored in the resource file 340, the resource catcher 310 terminates. The resource catcher 310 may be used to create one or more resource files 340 for one or more applications.

FIG. 5B shows an alternate embodiment of a resource file 340. A dialogue box user interface element may have one or more dialogue item user interface elements displayed thereon. Thus, in certain embodiments of the resource file, one user interface element may be considered the parent of another and both may be stored in the resource file. Therefore, for example, the parent ID of a user interface element may be the resource ID of another user interface element instead of a filename. As shown in FIG. 5B, entry 534 is a dialogue box, which is the parent of the dialogue items of entries 530 and 532. Thus, the parent ID's for the user interface elements of entries 530 and 532 are the resource ID of the parent user interface element in entry 534.

Figure 6:
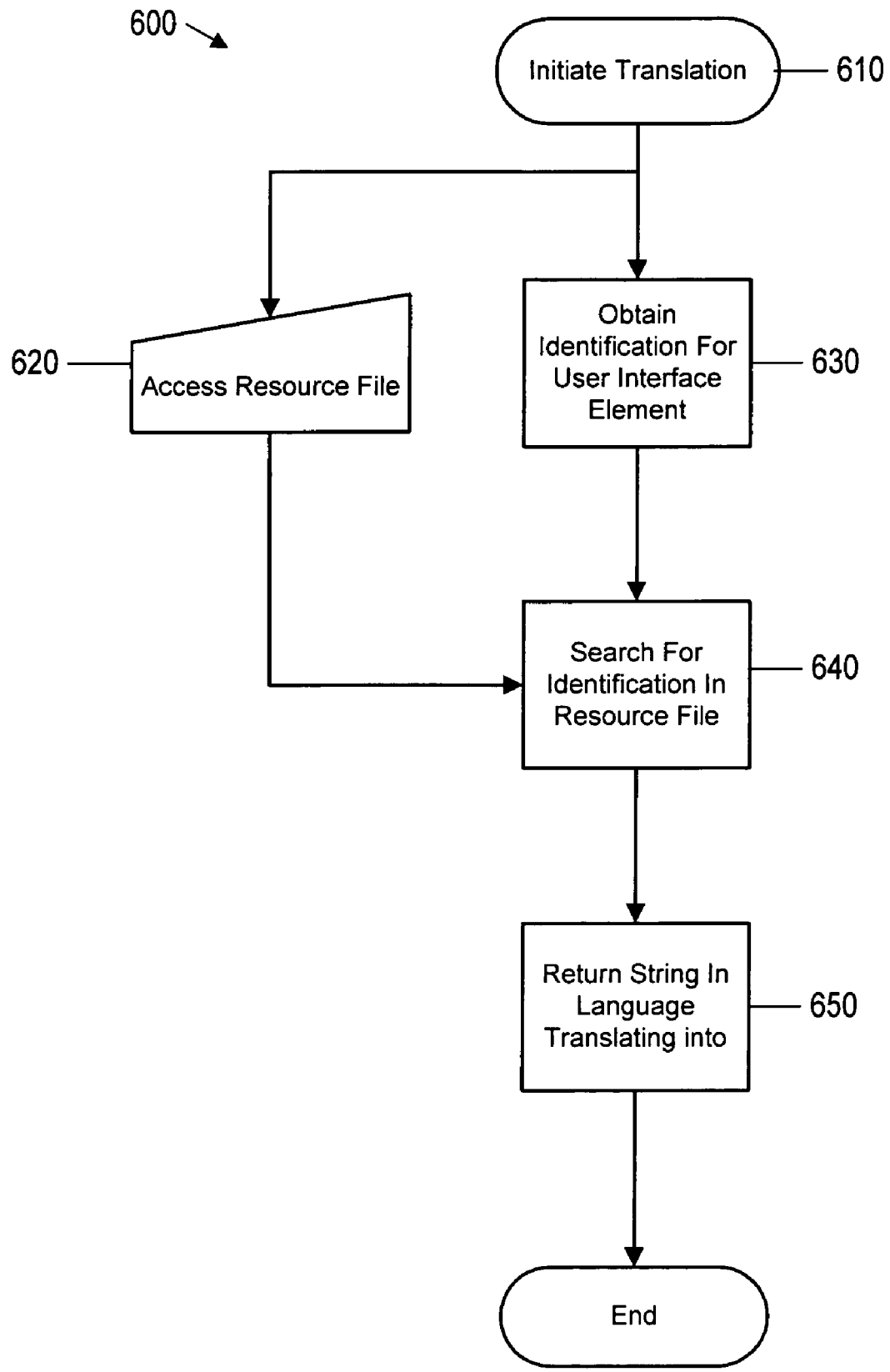
FIG. 6 is a flow diagram of a translation module in accordance with an embodiment of the invention.

In accordance with an embodiment of the invention, FIG. 6 illustrates a process 600 executed by the translation module 320. The translation module 320 is initiated in step 610. In one embodiment of the translation module, a resource file 340 is accessed in step 620 (comprising at least one string in a second language to be translated into and an ID for the user interface element on which the string is displayable) and an ID is obtained in step 620 for the user interface element on which the string in a first language to be translated is displayable. The ID may be obtained, for example, directly from the application containing the user interface element. The resource file 340 is searched in step 640 to find a matching ID in the resource file 340. Assuming that a match is found, the string in the second language is returned in step 650 by the translation module 320. The string may be returned in step 650, for example, to an application, file, object, subroutine, etc.

Figure 7:
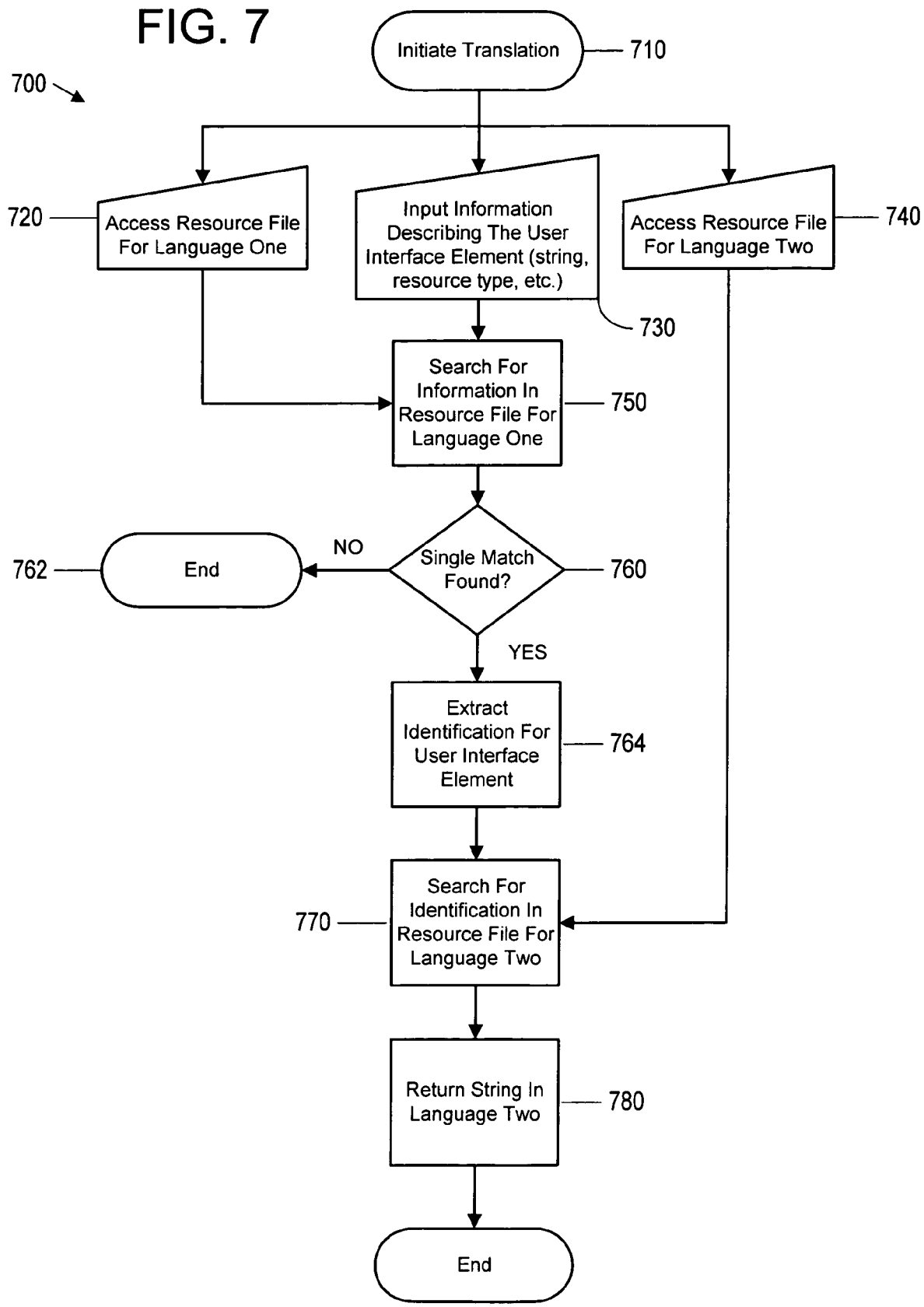
FIG. 7 is another flow diagram of a translation module in accordance with an embodiment of the invention.

Alternately, some embodiments of the translation module 320 may execute the process 700 as shown in FIG. 7. In this embodiment, there are two resource files 340 accessed in steps 720 and 740 containing strings in different languages, language one for a string to be translated from and language two for a string to be translated into. When initiated in step 710, the resource file 340 for language one (i.e. the language to be translated from) is accessed in step 720, and information is inputted in step 730 identifying the user interface element upon which the string to be translated may be displayed. The information identifying the user interface element may be the string by itself or it could be the string in combination with other information that identifies the user input element, such as the resource type, parent ID, etc. The translation module 320 searches in step 750 through the resource file for language one to find the ID identifying the user interface element that displays that string. At this point, a decision in step 760 is made. If a single match is not found, then the translation module 320 ends in step 762. This will usually occur if more information is necessary to identify a specific user interface element, thus requiring the user to insert more information and rerun the translation module 320. This might arise, for example, when the resource file 340 for language one contains entries from multiple files and the resource ID for the user interface element alone will not uniquely identify the desired user interface element.

If a match is found, then the ID is extracted in step 764 from the resource file 340 for language one. The translation module 320 then accesses the resource file 340 for language two (i.e. the language to translate into) in step 740 and searches in step 770 for that ID in the resource file. When the ID is found, the translation module 320 returns the string in language two in step 780, thus providing a translation of a user interface element from language one to language two.

In certain alternate embodiments, the resource catcher creates a resource file for each DLL (dynamic link library), such as User32.DLL, used by a process. When the translation module 320 is initiated, an internationalization function associates a resource in a first language with a localized resource in a second language. The internationalization function loads the resource file for the first language and then based on the filename, loads the localized equivalent in the second language. The point of similarity is the filename and location. For example, User32.DLL will exist in %winDir%\system32 by default. Of course, the use of the library can always override this functionality and provide an alternative name/path of the localized binary. Also, this can be done automatically if the process is specified (e.g. using Win32 APIs).

The resources in the first language and the localized resources in the second language may be kept in a single collection (named binaryTokens, for example) that associates the resource in the first language with the localized resource in the second language. When the user is translating, the resources in the collection are searched based on certain criteria, such as the string, resource type, filename, etc. When the string is found, the localized version in the second language is returned. The search criteria supplied by the user define a translation level, which may be strict, loose, or very loose depending on the number of criteria used. The translation level helps a user handle ambiguity when two or more entries contain identical data for certain criteria. By way of example and not limitation, very loose may be based on the resource type and string, loose may be based on the resource type, the string, and the filename, and strict may be based on resource type, string, filename, and parent user interface element. One of ordinary skill in the art would appreciate that alternate translation levels may be used with different search criteria and the number of translation levels need not be restricted to three.

Therefore, embodiments of the invention provide a reliable way to translate a user interface element from one language to another. The translation is a direct translation using one version of an application, etc. in one language and another version of the application, etc. in a different language. There is no need for a dictionary, and a user is confident that they have a correct translation. The following examples illustrate the application of embodiments of the invention but should not be construed as in any way limiting the scope of the embodiments of the invention.

In operation, certain embodiments of the invention are useful for testing user interface elements across multiple language versions of applications. Most people are only able to speak one or two languages at most, but the graphical user interfaces (GUI) for applications are often created in multiple different language versions to accommodate users in multiple countries. Thus, in order to test the GUI in more than one language version, a tester must either be able to speak the language displayed on the GUI, or the tester must use a resource ID for the user interface element being tested. The resource ID is typically a number, which provides a very unintuitive description of a user interface element. Instead, the translation system 300 allows a user to write an automated test once in the language they know and run the automated test in any language having a separate GUI.

Figure 8:
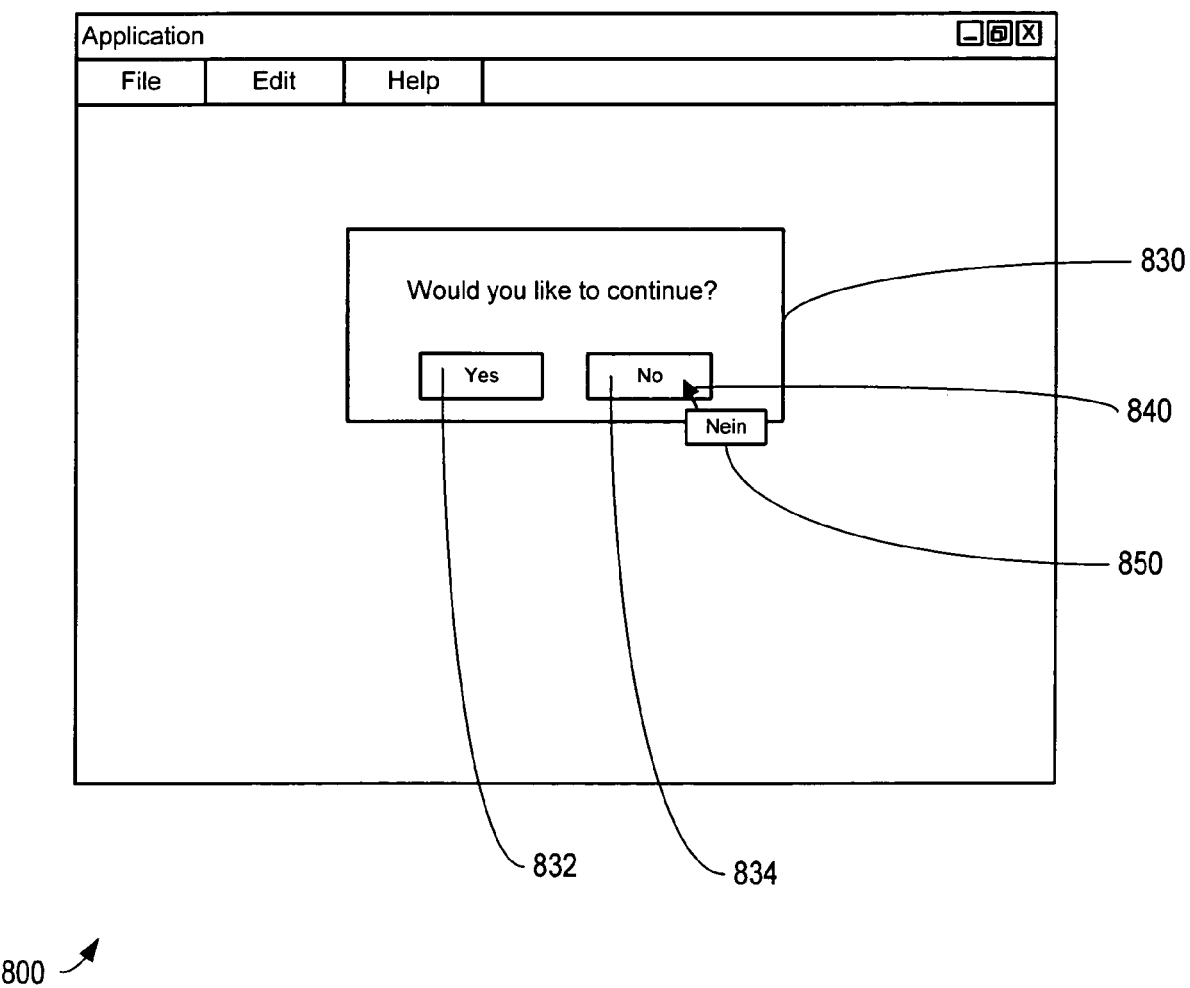
FIG. 8 is another example of a graphical user interface with user interface elements.

Additionally, the resource catcher 310 and translation module 320 are helpful for a tester in conducting manual tests. By way of example and not limitation, consider a German tester that is able to read German, but not English. Embodiments of the invention allow the tester to navigate through a GUI in a language that the tester cannot read by providing a translation in the language that the tester does know. As shown in FIG. 8, there is a GUI 800 in English comprising user interface elements (e.g., 830, 832, 834, etc.) and a user interface selection element 840. A tester that cannot read English would be unable to read the strings displayed on the user interface elements in this GUI 800. In accordance with the teachings of this invention, a tester is able to navigate the user interface selection element 840 over a user interface element, such as 834, and another user interface element 850 will appear (shown as a tool tip, for example), which displays the translation of the user interface element into the language that the tester understands (in this case, German). Therefore, the tester can manually navigate through and test user interface elements in languages that the tester cannot read, because a translation is provided by the translation module 320 and displayed on a user interface element 850. Although FIG. 8 shows the translation appearing in a new interface element 850, alternate embodiments may instead translate and temporarily replace the string on the user interface element 834 when a user interface selection element 840 is navigated over the user interface element 834.

Note that embodiments of the invention are also very beneficial for assisting with technical support. For example, a user may seek technical support for a language version of a GUI 800 that the technical support representative helping the user cannot read. Regardless, using certain embodiments of the invention, the technical support representative can navigate through the same language version of the GUI 800 that the user has to help the user troubleshoot the problem. The technical support representative is able to see exactly what the user sees, but the technical support representative has the additional ability to see the translated version of the user interface elements in a language that the technical support representative can understand. Therefore, assuming that the user and the technical support representative can both speak a common language, the technical support representative need not be able to read the language version that the user is using. This enhances technical support's ability to have a single representative assist a plurality of users using GUI's 800 in different languages.

The user interface selection element 840 is shown as an arrow, however, it will be appreciated by those of skill in the art that the user interface selection element 840 could be any suitable shape or size. The position on the GUI of the user interface selection element 840 is controlled by a user input device such as a mouse 161, keyboard 162, touchpad (not shown), or any other suitable user input device known in the art.

All references, including publications, patent applications, and patents, cited herein are hereby incorporated by reference to the same extent as if each reference were individually and specifically indicated to be incorporated by reference and were set forth in its entirety herein.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the embodiments of the invention. Therefore, the embodiments of the invention as described herein contemplate all such embodiments as may come within the scope of the following claims and equivalents thereof.

The use of the terms "a" and "an" and "the" and similar referents in the context of describing the embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments of the invention and does not pose a limitation on the scope of the embodiments of the invention unless otherwise claimed. No language in the specification should be construed as indicating any non-claimed element as essential to the practice of the embodiments of the invention.

Preferred embodiments of this invention are described herein, including the best mode known to the inventors for carrying out the embodiments of the invention. Variations of those preferred embodiments may become apparent to those of ordinary skill in the art upon reading the foregoing description. The inventors expect skilled artisans to employ such variations as appropriate, and the inventors intend for the embodiments of the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof are encompassed by embodiments of the invention unless otherwise indicated herein or otherwise clearly contradicted by context.

What is claimed is:

1. A method in a computer system for translating a string displayable on a display device, comprising:
   providing a list of strings in a second language, wherein:
      each entry of the list includes:
         a resource identification corresponding to a user interface element of the display device and
         a corresponding string in the second language, the corresponding string displayable within the user interface element, and
      each entry of the list excludes the corresponding string in any other language;
   obtaining a specific resource identification, wherein the specific resource identification identifies a specific user interface element of the display device on which a specific string is displayed in a first language;
   searching the list to find a specific entry including the specific resource identification;
   translating, without using a dictionary, the specific string from the first language into the second language by ascertaining, from the specific entry, a specific corresponding string in the second language; and
   displaying the specific corresponding string in the second language within the specific user interface element on the display device.

2. The method of claim 1, wherein the list contains at least two entries each including an identical corresponding string in the second language.

3. The method of claim 2, wherein the at least two entries each include a different resource identification corresponding to a different respective user interface element of the display device.

4. The method of claim 1, further comprising returning the specific corresponding string in the second language.

5. The method of claim 4, wherein the specific corresponding string in the second language is returned to an application.

6. The method of claim 1, wherein the list is created by obtaining:
   at least one resource identification corresponding to at least one user interface element of the display device, and
   at least one corresponding string in the second language, the at least one corresponding string displayable on a user interface element corresponding to the at least one resource identification.

7. The method of claim 1, further comprising providing a second list, wherein:
   each entry of the second list includes the resource identification corresponding to the user interface element and the corresponding string in the first language,
   each entry of the second list excludes the corresponding string in any language other than the first language, and
   the second list is not the dictionary.

8. The method of claim 7, wherein the step of obtaining the specific resource identification associated with the specific user interface element comprises obtaining the specific resource identification from a specific entry on the second list.

9. The method of claim 1, wherein the specific resource identification is a concatenation of identifiers that uniquely describes the specific user interface element.

10. A computer readable storage medium tangibly embodying a program of instruction executable by a computer for performing the method of claim 1.

11. In a computer system having a graphical user interface including a display and a user interface selection device, a method for translating a string, comprising:
   providing a list of strings in a second language, wherein:
      each entry of the list includes a resource identification corresponding to a user interface element of the graphical user interface and a corresponding string in the second language, the corresponding string displayable on the user interface element,
      each entry of the list excludes the corresponding string in any other language, and
      the list is not a dictionary;
   receiving input defining a location on the display of the user interface selection device;
   finding a specific user interface element having thereon a specific string in a first language, wherein the specific user interface element is associated with the defined location;
   obtaining a specific resource identification associated with the specific user interface element;
   searching the list to find a specific entry including the specific resource identification for the specific user interface element;
   translating the specific string from the first language into the second language by ascertaining, from the specific entry, a specific corresponding string in the second language; and
   displaying the specific corresponding string in the second language on the display.

12. The method of claim 11, wherein the specific corresponding string in the second language replaces the specific string in the first language on the display.

13. The method of claim 11, wherein the specific string in the first language and the specific corresponding string in the second language are both displayed on the display.

14. The method of claim 13, wherein the specific corresponding string in the second language is displayed in a tool tip user interface element.

* * * * *